Jan. 19, 1937.  D. R. CUTLER ET AL  2,068,227
AUTOMATIC CONTROL FOR RADIO APPARATUS
Filed Jan. 5, 1934   2 Sheets-Sheet 1

Inventors.
David R. Cutler
Eustace B. Corson
by Heard Smith & Tennant
Attys

Jan. 19, 1937.  D. R. CUTLER ET AL  2,068,227
AUTOMATIC CONTROL FOR RADIO APPARATUS
Filed Jan. 5, 1934  2 Sheets-Sheet 2
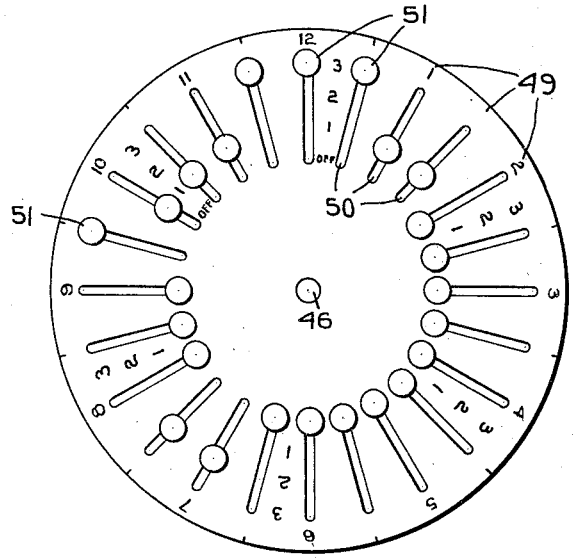
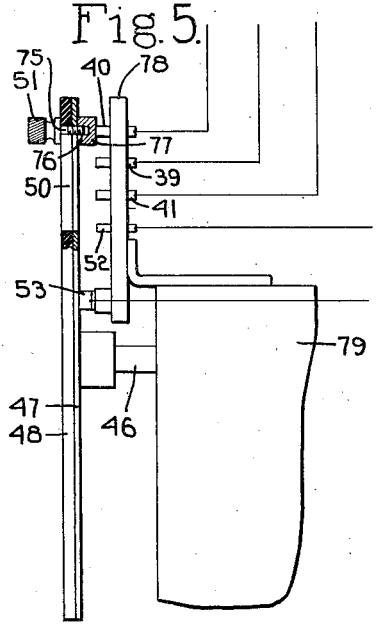
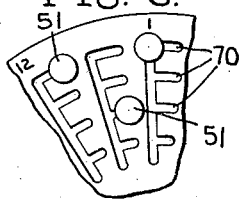
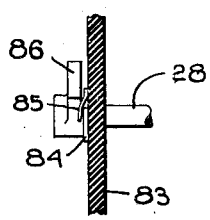
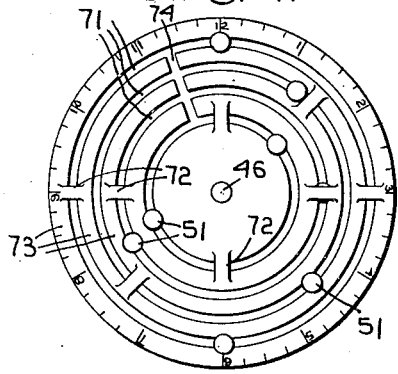
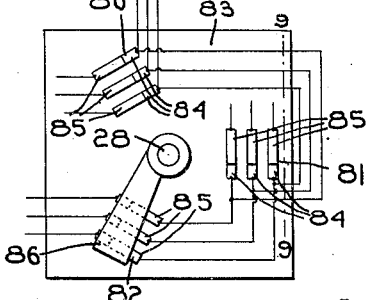
Inventors.
David R. Cutler
Eustace B. Corson
by Heard Smith &Tennant
Attys Patented Jan. 19, 1937

2,068,227

UNITED STATES PATENT OFFICE 2,068,227

AUTOMATIC CONTROL FOR RADIO APPARATUS

David R. Cutler, Quincy, Mass., and Eustace B. Corson, Rochester, N. H., assignors of one-third to Roger Wolcott, Sharon, Mass.

Application January 5, 1934, Serial No. 705,360

6 Claims. (Cl. 250—20)

This invention relates to radio-receiving apparatus and particularly to means for automatically controlling the apparatus to cause the apparatus to resonate or oscillate throughout a prearranged program of signals.

Most of the entertainment and educational features which are now available to the broadcast listener are presented according to a published program. The average listener has a definite preference for certain features in this program and very often the features to which he wishes to listen are broadcast from different broadcasting stations on different wave lengths. The listener must consequently readjust the apparatus at the end of one feature to obtain the signal he wishes to listen to during the succeeding portion of the program.

The principles of the invention are also applicable to the transmission of radio signals when transmission of a desired series of signals must be made according to a predetermined time sequence.

The principal object of the invention is to enable one to choose a program in advance and preadjust the apparatus in such manner that it will automatically respond to each feature of the chosen program.

A further object of the invention is to provide means for automatically responding to a diversified program which does not change the preadjusted electrical characteristics of the elements of the radio frequency circuits in the apparatus.

A further object of the invention is to provide a means coacting with the signal-selecting and timing means which acts automatically to energize and deenergize the apparatus at the beginning and end of each feature of the program and also during the selected program when no desired signal is on the air.

A further object of the invention is to provide a timing means for securing reception of a diversified program of signals in which the duration of an electrical impulse which secures the reception of the various portions of the program is made relatively short and it is controlled by other means than the slow moving main timing member.

Other objects and features of the invention will appear more fully in connection with the accompanying drawings and following description and will be particularly pointed out in the claims.

The invention consists essentially of a highly efficient means for controlling the tuning of a radio-receiving or transmitting apparatus automatically to resonate the circuits thereof according to a predetermined program. Considering the apparatus as designed to receive signals, the radio circuits may be designed according to any well-known practice and desirably a plurality of radio frequency amplification stages are employed. Each stage is supplied with power through a thermionic valve having the usual power supply elements. The radio frequency stages are connected to suitable audio amplifying devices to obtain the final audible signal. The tuning of the radio stages is obtained by means of a variable capacitance system which desirably is composed of a plurality of independently tunable capacitance units, each unit being capable of tuning all of the stages to resonate with a desired signal. Each of the capacitance units is independently connectible to the radio circuit or circuits and each is adjusted by means of a marked dial or other suitable means to the point where a desired signal will be received when and if they are connected to radio frequency circuits.

An automatic signal selecting switch is inserted in the grid leads extending from each of the radio stages to the capacity units and serves to obtain reception from the group of signals selected by the pretuning process. Other means may, however, be employed for obtaining reception of the desired signals by the apparatus.

The signal selecting means co-acts with a timing device to secure reception of the desired signals according to a predetermined time sequence. The timing device is driven by a clock mechanism and has adjustable contacts thereon which are preadjusted with relation to time intervals marked upon the timing means. These contacts are also placed in a predetermined station selecting position upon the timing means.

As the timing means is driven by the clock, the contacts thereon establish electrical impulses which set the station-selecting means in motion to secure reception of the signal called for during each time period.

In the drawings:

Fig. 4 is a front elevation of a main timing member.

Fig. 5 is a side elevation of a timing member illustrated in Fig. 4.

Fig. 6 is a fragmentary view showing a modified construction of the timing member.

Fig. 7 is a front elevation of a modified construction of the timing member.

Fig. 8 is a front elevation of a modified construction of the signal-selecting mechanism.

Fig. 9 is a cross section on line 9—9 of Fig. 8.

Figure 1:
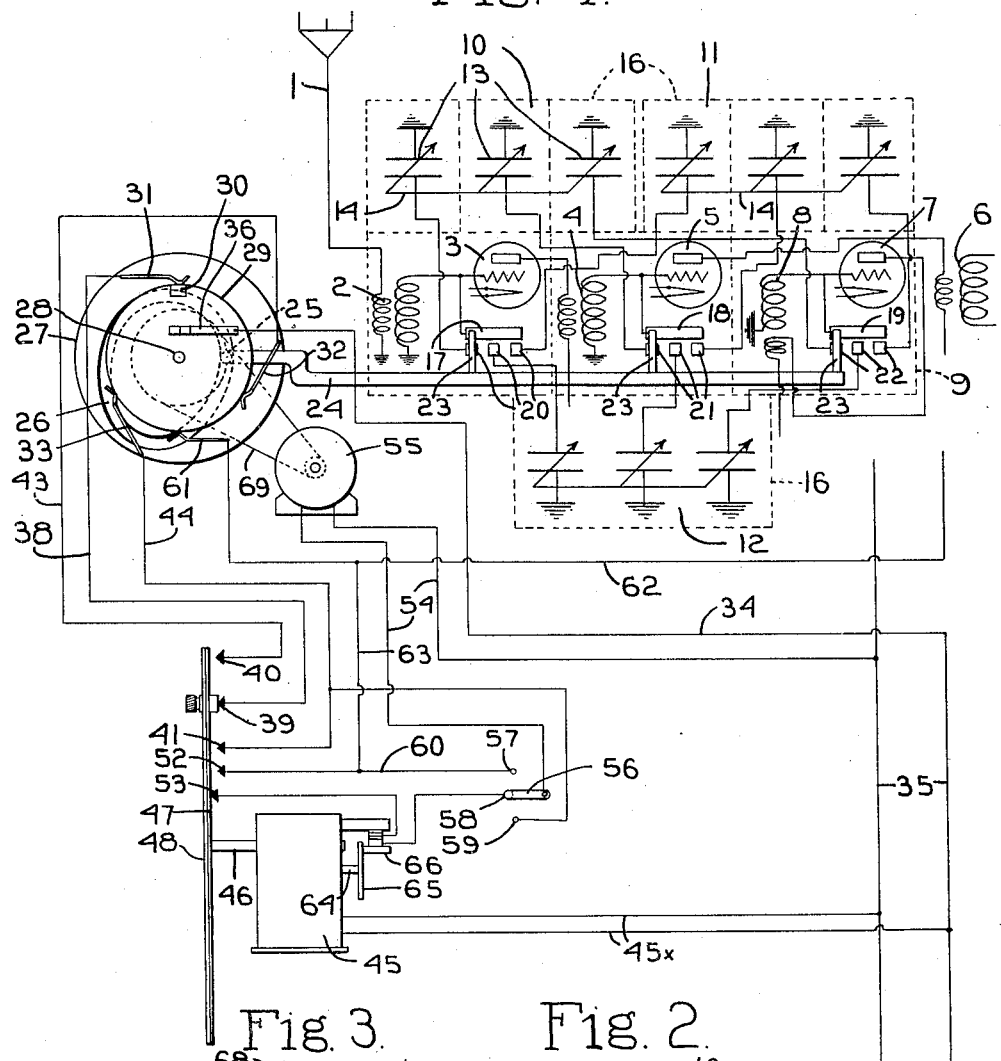
Fig. 1 is a diagrammatic illustration of a preferred embodiment of the invention.
Figure 3:
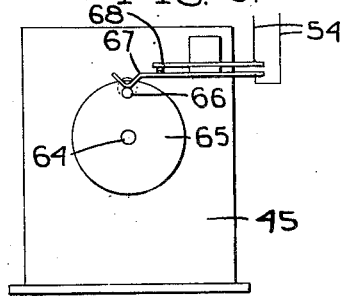
Fig. 3 is a view illustrating a mechanism actuated by the timing clock mechanism which functions to reduce the duration of the signal-selecting impulse.
Figure 2:
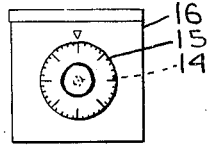
Fig. 2 is a view in elevation of one of the tuning units.

Preferred embodiments of the invention are illustrated herein more accurately and completely to present the principles of the invention and not as a limitation thereon. A diagrammatic illustration of the radio circuits of a multistage radio-receiving apparatus is shown in Fig. 1 in which an antenna 1 picks up radio frequency energy in the form of signals and feeds it to the transformer 2 in the first radio stage. The high potential end of the secondary of the transformer 2 is connected to the grid of a thermionic valve 3, the output of which is fed to a transformer 4 in the second amplifying stage. The high potential end of the secondary of the transformer 4 is connected to the grid of a thermionic valve 5. The valve 5 in the particular type of circuit shown acts as a first detector and serves to detect the incoming signal. The output of the valve 5 is connected to a transformer or any other suitable device which in turn may be connected to an intermediate frequency amplifier, not shown, or any other suitable element. The output of the intermediate frequency amplifier may be again detected and then amplified at audio frequency in the usual manner.

A third thermionic valve 7 is employed as an oscillator, its output being fed to a transformer 8, the secondary of which is connected to the grid of the valve 7. The frequency of the oscillator valve 7 and the first detector valve are combined to create the beat or intermediate frequency.

Each radio frequency stage is desirably shielded against undesirable coupling due to stray fields by electrically conductive metallic containers represented by dotted lines 9. The shields are desirably grounded and connected to the power supply elements in the usual manner to complete various circuits. The low potential end of the transformer coils above described are grounded in the usual manner. The power connections to the plates of the thermionic valves are not completed but it is to be understood that any suitable power connections and power supply elements may be employed since these parts of the apparatus form no part of the invention.

The tuning of the radio stages is accomplished by means of a variable capacitance which may be of any desirable construction and operation. As shown in the drawings, the tuning is accomplished by means of a capacitance system. This system is composed of a plurality of independently adjustable capacitance units. Any number of these units may be employed depending upon the number of different signals to which it is desired to listen throughout a selected program.

There are three such units 10, 11, and 12 shown in the drawings permitting the choice of a program containing three different signals. Each of the capacitance units is composed of three groups of interleaving plates shown diagrammatically at 13, each group of plates being adapted to tune one of the amplifying stages. The movable plates of all of the groups are arranged in the usual manner or any suitable manner such as upon a common rotatable shaft indicated diagrammatically at 14. The shaft of each capacitance unit is independently rotatable and desirably is provided with the usual dial 15 or other suitable means to indicate wave length or kilocycles. The dial provides means for adjusting the capacitance to receive a desired signal. Each group of plates in the capacitance stages is properly adjusted on their respective shafts accurately to resonate all of the radio frequency stages simultaneously. Each capacitance unit desirably is enclosed in a grounded electrically conductive metallic shield indicated in dotted lines in Fig. 1 at 16. Each capacitance unit is situated as closely as possible to the radio frequency stages thus to shorten the lead wires connecting the grid circuit of the stages with the groups of plates in the capacitance units.

The grid lead of the valve 3 is connected to a switch contact plate 17. The grid lead of the valve 5 is connected to a contact plate 18, while the grid lead of the valve 7 is connected to a contact plate 19. The connections to the switch contact plates are desirably as short as possible to reduce undesirable coupling between stages. The plates 17, 18 and 19 may be situated inside the shields enclosing the respective radio stages or may be mounted on the outside thereof and insulated therefrom.

The group of contacts 20 equal in number to the number of radio stages is situated adjacent the plate 17. Other similar groups of contacts 21 and 22 are situated, respectively, adjacent the plates 18 and 19. These groups of contacts are also insulated from the shielding of the stages. The left-hand contact of the groups 20, 21, and 22 are connected, respectively, to the three groups of capacitance plates in the capacitance unit 10. The central contact of each of the groups of contacts is connected, respectively, to the three groups of plates in the capacitance unit 12 and the right-hand contact of each group is connected, respectively, to the three groups of plates in the capacitance unit 11.

Connection is established between the plates 17, 18, and 19 and one at a time of the contacts in the groups 20, 21, and 22 by means of movable switching contacts 23. The three switching contacts 23 are secured to a non-magnetic, non-conducting switch arm 24. When the switch arm is in the position shown in the drawings, the capacitance unit 10 acts to resonate the radio frequency stages to receive the particular signal for which it is adjusted. By moving the arm to the right, the capacitance units 12 and 11 are successively brought into action to resonate the stages. The left-hand end of the arm 24 is extended and has a cam follower 25 thereon which is situated in a cam groove 26 formed in a cam 27. The cam groove 26 is designed to move the arm into its three contacting positions at three different points in one complete revolution thereof. By rotating the shaft 28, therefore, the apparatus may be tuned to receive any of the signals to which the capacitance units 10, 11, and 12 are pretuned.

It will be noted that by the construction of the switching means above described, the lead wires extending from the grids of the thermionic valves to the capacitance units are of minimum length and the switch contact members may be designed to provide a minimum capacitance coupling therebetween. It is the particular form of low capacitance coupling incorporated in the design of the switching device which accomplishes the important result of reducing to a minimum the undesirable capacitance coupling between the radio frequency stages. Furthermore, by this construction the mechanical station-selecting mechanism of which the cam 27 is a part may be situated remotely from the radio frequency circuits, thereby producing no ill effect upon the electrical balance of the various circuits.

Upon the shaft 28 a signal-selecting member 29 is also secured. The member 29 may be of any suitable construction and, as herein shown, it comprises a metallic disk having at one point in its periphery an insulated insert 30. Situated at spaced intervals about the periphery of the disk 29 and in electrical contact therewith is a plurality of contact members. There are as many of these contact members as there are capacitance units, plus an additional one later to be described. As shown herein, there are three such contact members 31, 32 and 33. The plate 29 is electrically connected to a conductor 34 extending to one side of a power line 35 by means of a brush 36 engaging the disk. This side of the line also extends directly to the power elements of the receiving apparatus.

The contact member 31 is connected to a conductor 38, which in turn is connected to a fixed contact 39 upon a timing device to be described hereinafter. The contact members 32 and 33 are respectively connected to contacts 40 and 41 upon the timing device by means of conductors 43 and 44.

The timing device is composed of a clock mechanism 45 desirably driven by a self-starting synchronous electric motor connected to the supply line 35 by the circuit 45x. The clock is provided with a shaft 46 which rotates once in twelve hours or once in any desired period of time depending upon the estimated maximum length of the listening period. The shaft 46 has secured thereon a timing member 47 which may have any suitable construction. As shown in Fig. 1, the timing member is a flat circular disk of electrically conductive material which may desirably be faced with a layer of non-conductive material 48.

The disk 47 may be divided into any desired number of divisions and is herein divided into twenty-four divisions along its periphery, each division representing one-half hour of time as shown at 49 in Fig. 4. The disk 47 is provided with radial slots 50 at one-half hour intervals within which are received adjustable contacts 51. The disk 47 is also divided into zones extending from the inner end of the slots outward. The inner zone is marked "off" and the three successive outwardly extending zones are given the numerals 1, 2, and 3. Each zone is situated a distance from the axis of the shaft equal to the distance from the axis of the shaft to a plurality of fixed contacts. The zone marked "off" is situated opposite the fixed contact 52. The zones 1, 2, and 3 are respectively opposite the contacts 41, 39, and 40. Current is supplied to the disk 47 through a brush 53 which is connected to the opposite side of the power supply 35 to that connected to the conductor 34 by means of the circuit 54. The circuit 54 has inserted in series therein a motor 55 and a manual switch 56. The switch 56 has three positions, an off position, an automatic control position, and a manual control position, having respectively contact points 57, 58, and 59.

The off contact 57 is connected to the contact 52 in the "off" zone of the timing member 47 by means of a conductor 60. The disk 29 is provided with a contacting member 61 which is connected to the power elements of the receiving apparatus by means of the conductor 62 which acts with the left hand conductor of the power line 35 to energize the apparatus. The conductors 60 and 62 are interconnected by means of the conductor 63. The contact 59 is connected to the conductor 44 leading to the contact member 33 on the signal selecting means.

Inasmuch as the disk 47 rotates very slowly, the contacts 51 engage the fixed contacts on the timing device throughout a considerable period of time. It is unnecessary for the current to flow for this long period of time and means are provided to reduce the period during which the current flows to the minimum required to actuate the apparatus. To accomplish this, another shaft 64 of the clock mechanism which rotates a revolution in a much shorter period of time than does the shaft 46 is chosen. The shaft 64 may rotate, for instance, once every ten or fifteen minutes. The shaft 64 has thereon a disk 65 which has extending therefrom a pin 66. The pin 66 is situated in position to engage a flexible contact member 67. The contact member 67 when engaged by the pin 66 moves upward into contact with a cooperating contact member 68. The contact members 67 and 68 are connected in series in the circuit 54 and permit current to flow in this conductor only when the pin 66 is engaging the contact 67. This period may be of a few seconds' duration. During the period just before one of the contacts 51 engages with a cooperating fixed contact, no current is transmitted to the contact until the pin 66 in the disk 65 engages the contact 67 and, as soon as the pin 66 leaves the contact 67, the current in the conductor 54 is again interrupted even though the contact 51 may still be in engagement with its cooperating fixed contact. This device also reduces the necessity for accurate positioning of the contacts 51 upon the timing member.

The operation of the device is as follows. The particular signals it is desired to receive are selected and the capacitance units 10, 11 and 12 are each independently tuned to receive one of the desired signals. The adjustable contacts 51 on the timing member 47 are then adjusted within their respective slots to cause the apparatus to receive the desired signal according to a predetermined time sequence.

Referring to Fig. 4, commencing at seven o'clock, the contacts 51 are placed in the number 2 zone in both the seven o'clock and seven-thirty o'clock slots. When the clock indicates seven o'clock, therefore, the contact 51 in the slot representing seven o'clock will engage the contact 39 which will act to energize the contact 31 and the circuit 54 extending through the motor 55. The motor is connected to the shaft 28 by means of a belt 69 passing over pulleys upon the motor shaft and upon the shaft 28. The motor continues to rotate until the insulated section 30 upon the disk 29 comes beneath the contact 31, as shown in the drawings, at which time the current is cut off from the motor and the shaft 28 stops at a selected position. At this time the apparatus is energized from the line 35 by the left hand conductor, the conductor 34, brush 36, contact 61, and the conductor 62. While the shaft 28 rotates, the cam 27 acts properly to position the switch arm 24 to receive the particular signal which has previously been chosen to be heard when the contact 51 is in the zone number 2. The apparatus will now continue to receive this particular signal for one hour. Assuming that the timing member 27 is turning anticlockwise at the end of the one-hour period, the contacts 51 in the slots representing eight o'clock, eight-thirty o'clock and nine o'clock have been moved into the "off" zone. At this time the contact 52 and the conductor 60 is energized which in turn energize the conductors 60 and 63 and the contact 61 through a portion of the conductor 62. The motor then operates to move the insulated section 30 beneath the contact 61. When this occurs the current flowing from the right hand conductor of the line 35 through conductors 34 and 62 is cut off and the apparatus is thus deenergized. The apparatus is then silent for a period of an hour and a half. At the end of this period the contact 51 in the slot representing nine-thirty o'clock is placed in the number 3 zone which will energize the contact 40. The contact 40 is connected through the conductor 43 to the contact 32. The motor 37 will again be started and continue to run until the insulated section 30 comes beneath the contact 32 and cuts off the power to the motor. At this time the switch arm 24 will have been moved into its correct signal-selecting position. At the same time the insulated section 30 will have moved away from the contact 61 which will again engage the disc 29 to again connect the power element with the power supply and thereby reenergize the apparatus.

The apparatus continues to function in a manner similar to the manner already described until the full listening period has been consumed. If the timing device is constructed to cover a period of twenty-four hours, the same program may be listened to on the succeeding day. Obviously any desired arrangement may be provided for and on a succeeding listening period the whole program may be rearranged.

The automatic operation of the apparatus above described take place when the switch 56 is in the automatic position engaging the contact 58 as shown in the drawings. When it is desired to discontinue the use of the apparatus the switch is moved into the off position engaging the contact 57. This extends the motor circuit 54 through the conduits 60 and 63 to the contact 61 and operates the motor 55 to bring the section 30 of the disc 29 beneath the contact 61 which cuts off the power to the motor and to all parts of the apparatus except the clock 45 which desirably is left in operation.

When it is desired to manually tune the apparatus the switch is moved into engagement with the contact 59. This act extends the motor circuit 54 through the conductor 44 to contact 33 which acts to cut off the controlling action of the clock 45 and to bring the switch arm 24 into a definite position, namely, its right hand position, thereby to connect a known capacitance unit with the radio stages. The dial 15 is then turned manually to receive any desired signal.

The timing member 47 may be modified as shown in Fig. 6 wherein lateral extensions of the various slots are made at the various zones. By adjusting the contacts 51 along the lateral portions 70 of the slots 50, the device may be adjusted to provide for listening periods of fifteen-minute intervals instead of being limited to half-hour periods. Still another modification of the timing member is shown in Fig. 7. In this form of the device the timing member 47 is provided with a plurality of concentric continuous slots 71 situated in the same location as the zones described in connection with Fig. 4. Each of the slots 71 is provided with one or more contact members 51 which may be located within the slots 71 in an unlimited number of time positions thereby providing means for changing signals at any time throughout a program. The periphery of this timing member is divided into quarter-hour periods, but may be divided into finer divisions if it is found desirable, which act as a guide in locating the contact members 51 within their slots. In order to secure the concentric portions of the disk which are divided by the slots 71, a plurality of bridge portions 72 are provided which extend between the concentric portions of the plate 73 thereby uniting the whole plate into one unit. The bridge portions 72 may be so constructed that the contact members 51 may pass beneath them thereby avoiding interference in adjusting the contacts. If desired, a plurality of radial slots 74 may be provided extending through the zones of the plate 47 thereby providing means for moving a contact member 51 in one slot into any of the other slots. Obviously the number of contact members 51 in the slots may be varied by inserting or removing one or more of the contacts at any time.

The contact members 51 may be of any desirable construction and, as shown herein, comprise two members, an outer member 75 which has a screw-threaded shank 76 extending through the member 47 and has threaded engagement with an inner member 77 which engages with the fixed contacts previously described which are situated in a contact block 78 secured to the casing 79 of the clock mechanism or to any rigid part of the apparatus.

Fig. 8 illustrates a modified form of the signal-selecting switching means. Three groups of switches 80, 81, and 82 are spaced about the center of a fixed plate 83 of insulating material. Each group comprises three switches, one for each of the capacitance units 10, 11, and 12. Each switch comprises a fixed member 84 and a movable member 85 situated in position to make contact with the fixed member when moved downwardly.

The plate 83 is provided with an aperture through which the shaft 28 of the signal-selecting mechanism extends. The shaft 28 also has thereon the cam member 86 which rotates with the shaft and successively engages the movable members of the groups of switches closing each of the switches in the groups as it passes thereover. The cam member 86 is positioned with relation to the disk 29 so that when the insulated section 30 of the disk passes under a selected one of the contacts 31, 32 and 33, it will act to close the switches in one of the groups 80, 81, and 82.

The fixed members 84 of the independent switches constituting the groups 80, 81, and 82 are interconnected and the three common connections to these members are connected to the grids of the thermionic valves in the three radio frequency stages. The movable members of the three switches in the group 80 are connected to the three groups of plates in the capacitance unit 10. The three movable members in the group 81 are connected, respectively, to the three groups of plates in the capacitance unit 11, while the three movable members in the group 82 are connected, respectively, to the three groups of plates in the capacitance 12. Obviously the function of the device illustrated in Fig. 8 is the same as the switching means described in connection with Fig. 1 and actuated by the switch arm 24 in connection with the cam 27.

It will be understood that the apparatus as above described may have any suitable construction within the scope of the claims. For instance, in place of the grooved cam 27 any other type of cam may be used or any switching means which will produce an equivalent result.

If the apparatus is to be used for transmitting purposes sufficient power may be supplied to the circuits and the characteristics of the circuits so adjusted that oscillation is set up which will cause energy to be radiated from the antenna. Any of the usual means may be used to modulate the oscillations such as a switch, key, or a microphone.

Having thus described the invention, what is claimed as new, and desired to be secured by Letters Patent, is:

1. In a radio receiving apparatus, a radio frequency circuit having an inductance and a thermionic valve incorporated therein, an adjustable capacitance connectible to and capable of resonating said circuit to receive signals within a desired wave length range, an automatic signal selecting switch comprising a cam-actuated switch arm co-acting with said capacitance to cause the apparatus to receive a predetermined series of signals said switch having a position for each of a desired series of signals and an electrical conductor which when energized causes the switch to assume one of said positions, a timing member actuated by a clock mechanism, manually adjustable contact members on said timing member engaging and energizing one at a time the conductors on said signal selecting switch to cause the switch to assume a selected position whereby a predetermined series of signals may be received according to a predetermined time sequence determined by the adjusted position of said contact members upon said timing member and means in the supply circuit actuated by said timing device to deenergize the apparatus during the periods when no signal is wanted.

2. In a radio receiving apparatus, a plurality of radio frequency amplifying stages each having a fixed inductance and a thermionic valve incorporated therein, a plurality of independently adjustable capacitances each capable of resonating said radio stages and each pretuned to resonate the radio stages to receive a different desired signal, an electrically operated rotatable disk having a fixed stop position for each of said capacitances, a cam rotatable with said disk, a switch arm actuated by said cam acting when in a stop position to connect selected capacitances to said circuit, an electrical conductor for each stop position which when energized actuates said switching means until it reaches the stop position controlled by the respective conductor, a timing member actuated by a clock mechanism, manually adjustable contact members on said timing member engaging and energizing one at a time of said conductors to cause said switching means to assume a selected position whereby a predetermined series of signals is received according to a predetermined time sequence determined by the adjusted position of said contact members upon said timing member.

3. In a radio receiving apparatus, a radio frequency circuit having an inductance and a thermionic valve incorporated therein, an adjustable capacitance capable of resonating said circuit to receive a desired range of wave lengths, automatic signal selecting means coacting with said capacitance to cause the apparatus to receive a desired series of signals, manual signal selecting means operable to select any desired signal, circuit breaking means on said signal selecting means, automatic timing means acting in conjunction with said signal selecting means to secure reception of the desired series of signals according to a predetermined time sequence and a manual switch having three positions, in one position acting to cause automatic operation of the apparatus, in a second position acting to operate said circuit breaking means to de-energize the apparatus and in its third position acting to eliminate automatic control of said timing means and said signal selecting means and permitting operation of said manual signal selecting means.

4. In a radio receiving apparatus a radio frequency circuit having an inductance and a thermionic valve incorporated therein, an adjustable capacitance connectible to and capable of resonating the said circuit to receive signals within a desired wave length range, automatic preadjustable signal selecting means acting to correlate said capacitance with said circuit to secure reception of a desired series of signals, a timing member actuated by a clock mechanism, radially adjustable contacts on said timing member cooperating with a plurality of conductors to transmit electric impulses to said selecting means at predetermined time intervals which act through said signal selecting means to secure reception of said desired series of signals according to a predetermined time sequence and means actuated by said clock mechanism acting to time the duration of said impulses independently of the period said contacts engage their cooperating conductors.

5. A timing device for radio receiving apparatus comprising a disk, a clock mechanism for rotating said disk, a plurality of concentric circular ways upon said disk, selectively movable contact members slidable in each of said ways adjustable throughout the length thereof, communications between said ways permitting the contact members to be shifted from one way to another, means to lock said contact member in adjusted position, a plurality of control circuits, and a fixed contact member connected to each of said control circuits coacting with said adjustable contacts upon said disk to cause electric impulses to be transmitted to the receiving apparatus through said control circuits at timed intervals.

6. A timing device for radio receiving apparatus comprising a disk having a plurality of radially disposed ways thereon, a plurality of laterally extending ways communicating with each of said radially disposed ways within the disk, a contact member in each way adjustable throughout the length of the way, means to lock said contact in an adjusted position within the way, clock mechanism acting to rotate said disk, a plurality of control circuits, and a fixed contact member connected to each of said control circuits and coacting with said adjustable contacts to cause electric impulses to be transmitted to the receiving apparatus through said control circuits at timed intervals.

DAVID R. CUTLER.
EUSTACE B. CORSON.